United States Patent [19]

Beggs et al.

[11] Patent Number: 4,539,244

[45] Date of Patent: Sep. 3, 1985

[54] HONEYCOMB NOISE ATTENUATION STRUCTURE

[75] Inventors: Stanley L. Beggs, Chula Vista; Frank J. Riel, San Diego; Dale W. R. Lawson, Bonita, all of Calif.

[73] Assignee: Rohr Industries, Inc., Chula Vista, Calif.

[21] Appl. No.: 583,295

[22] Filed: Feb. 29, 1984

Related U.S. Application Data

[63] Continuation of Ser. No. 64,000, Aug. 6, 1979, abandoned, which is a continuation-in-part of Ser. No. 604,200, Aug. 13, 1975, abandoned.

[51] Int. Cl.³ .............................................. B32B 3/12
[52] U.S. Cl. .................................... 428/116; 52/806; 181/292; 428/138
[58] Field of Search ................ 428/116, 118, 138, 73; 181/292; 52/806; 156/197, 292

[56] References Cited

U.S. PATENT DOCUMENTS

| | | | |
|---|---|---|---|
| 2,828,235 | 3/1958 | Holland et al. | 428/118 |
| 2,951,004 | 8/1960 | Martin et al. | 428/116 X |
| 2,952,579 | 9/1960 | Merriman | 428/118 |
| 3,053,720 | 9/1962 | Edds | 156/197 X |
| 3,085,572 | 4/1963 | Blackford | 428/131 X |
| 3,166,149 | 1/1965 | Hulse et al. | 428/118 X |
| 3,327,866 | 6/1967 | Pall et al. | 428/685 X |
| 3,502,171 | 3/1970 | Cowan | 428/116 X |
| 3,690,606 | 9/1972 | Pall | 428/116 X |
| 3,693,750 | 9/1972 | Takkunen | 428/116 X |
| 3,713,959 | 1/1973 | Rottmayer et al. | 428/116 X |
| 3,770,560 | 11/1973 | Elder et al. | 428/138 |
| 3,821,999 | 7/1974 | Guess et al. | 428/116 X |
| 3,932,249 | 1/1976 | Jury et al. | 428/116 X |
| 4,025,681 | 5/1977 | Donnelly et al. | 428/116 |
| 4,254,171 | 3/1981 | Beggs et al. | 428/116 |
| 4,271,219 | 6/1981 | Brown | 428/116 |
| 4,294,329 | 10/1981 | Rose et al. | 428/116 X |
| 4,379,191 | 4/1983 | Beggs et al. | 52/806 X |
| 4,384,020 | 5/1983 | Beggs et al. | 428/138 |
| 4,421,811 | 12/1983 | Rose et al. | 428/116 |
| 4,465,725 | 8/1984 | Riel | 428/116 |

FOREIGN PATENT DOCUMENTS 961785  6/1964  United Kingdom .............. 428/116

*Primary Examiner*—Henry F. Epstein
*Attorney, Agent, or Firm*—Patrick J. Schlesinger; Frank D. Gilliam

[57] ABSTRACT

Broad band noise attenuation sandwich panels utilizing a cellular core positioned between and bonded to two facing sheets by an adhesive bonding system. One facing sheet is perforated and the other imperforate. A thin sheet of porous fibrous felt or fabric is bonded to the outer surface of the perforate sheet. The adhesive layer, at least between the perforate sheet and the porous fibrous material, is sufficiently thick to isolate the two components and form a funnel shaped opening necked down at the entrance to each perforation.

18 Claims, 2 Drawing Figures

HONEYCOMB NOISE ATTENUATION STRUCTURE

BACKGROUND OF THE INVENTION

This application is a continuation of application Ser. No. 064,000, filed Aug. 6, 1979, now abandoned, which is a continuation-in-part of Ser. No. 604,200, filed Aug. 13, 1975, now abandoned.

This invention relates to a process for producing improved noise attenuation panels and more particularly to attenuation panels utilized in a severe environment. Examples of its application being within a turbo fan aircraft engine or outer skin surfaces adjacent to the engine which are exposed to in-flight conditions.

In the design and manufacture of sound attenuation panels which additionally provides structural integrity in severe environments, it has been common practice to provide an attenuation panel wherein honeycomb core material is sandwiched between a perforate and imperforate sheet of material. Panels of this type of construction, although satisfactory for attenuating some specific sound frequencies, are found to be inadequate over a broad range of frequencies customarily encountered within and round the housings of modern turbine engines; it has also been found that the perforations when placed adjacent to high speed gas and air flow areas within or adjacent the engine create turbulence to that high speed flow which reduces the overall efficiency of the engine; it has additionally been found that similar metals or partially non-metals must be utilized in the prior art panels to prevent any galvanic action which occurs between dissimilar metals in contact which results in constant bond line delamination between the various adjacent non-similar metal sandwiched components.

There has not been an entirely satisfactory attenuation material with structural integrity and the capability of withstanding severe environmental conditions such as those encountered in and around turbine engines until the emergence of the instant invention.

SUMMARY OF THE INVENTION

It is the primary object of this invention to provide a manufacturing process and the resulting improved sound attenuation material for reduction of turbine engine noises through a large spectrum of noise frequencies that has the strength required to be utilized as an integral portion of the structure rather than in addition to the structure located where sound attenuation is desired, such as a cowling surrounding an aircraft turbine engine.

A further object is to provide an acoustic material incorporating the Helmholtz resonant cavity sound attenuation principles.

A further object is to provide suitable isolation or insulation between the components to prevent any galvanic action caused by contact of dissimilar metals.

A further object is to provide a method of manufacture that provides a predetermined flow resistance from the outer surface of the attenuation material adjacent to the source of noise to be attenuated in the resonance cavities of the core of the material. A further object of the invention is to provide a process for manufacturing an attenuation material comprising a central honeycomb core having a plurality of cells enclosed on the one surface by an imperforate sheet of material and a perforate sheet of material on the other surface, the outside sound source exposed surface of the perforate material having a layer of fibrous or woven material bonded thereto with improved sound attenuation characteristics.

A still further object is to provide an adhesive bond between the perforated sheet and the layer of fibrous or woven material that has the effect of a greater open area than the actual open area through the porous fibrous material and the perforations.

A still further object is to provide a sandwiched acoustic material that can be cut to required size, trimmed or drilled without causing physical contact between any adjacent dissimilar metals.

A yet further object is to provide a process for bonding together the components of sandwiched acoustic material including honeycomb core sandwiched between an imperforate sheet, and a combined perforate sheet and porous fibrous material wherein the adhesive used for bonding is substantially prevented from flowing by capillary or wicking action into the perforations or between the fibers of the fibrous material.

These and other objects and advantages of the invention will become better understood by reference to the following detailed description. When considered with the drawings, in which:

DETAILED DESCRIPTION OF THE PREFERRED EMBODIMENT OF THE INVENTION

Figure 1:
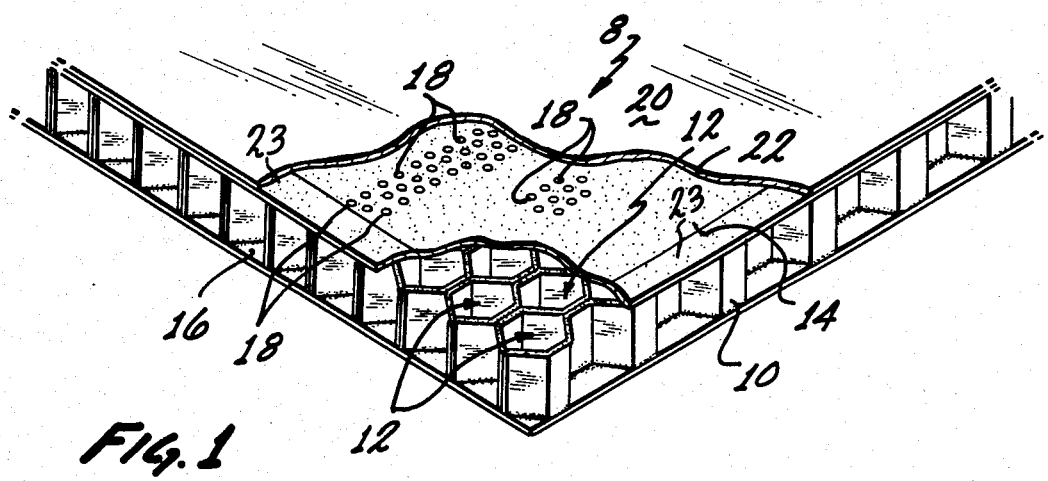
FIG. 1 is a perspective view of a completed acoustic panel constructed by the process of the instant invention.
Figure 2:
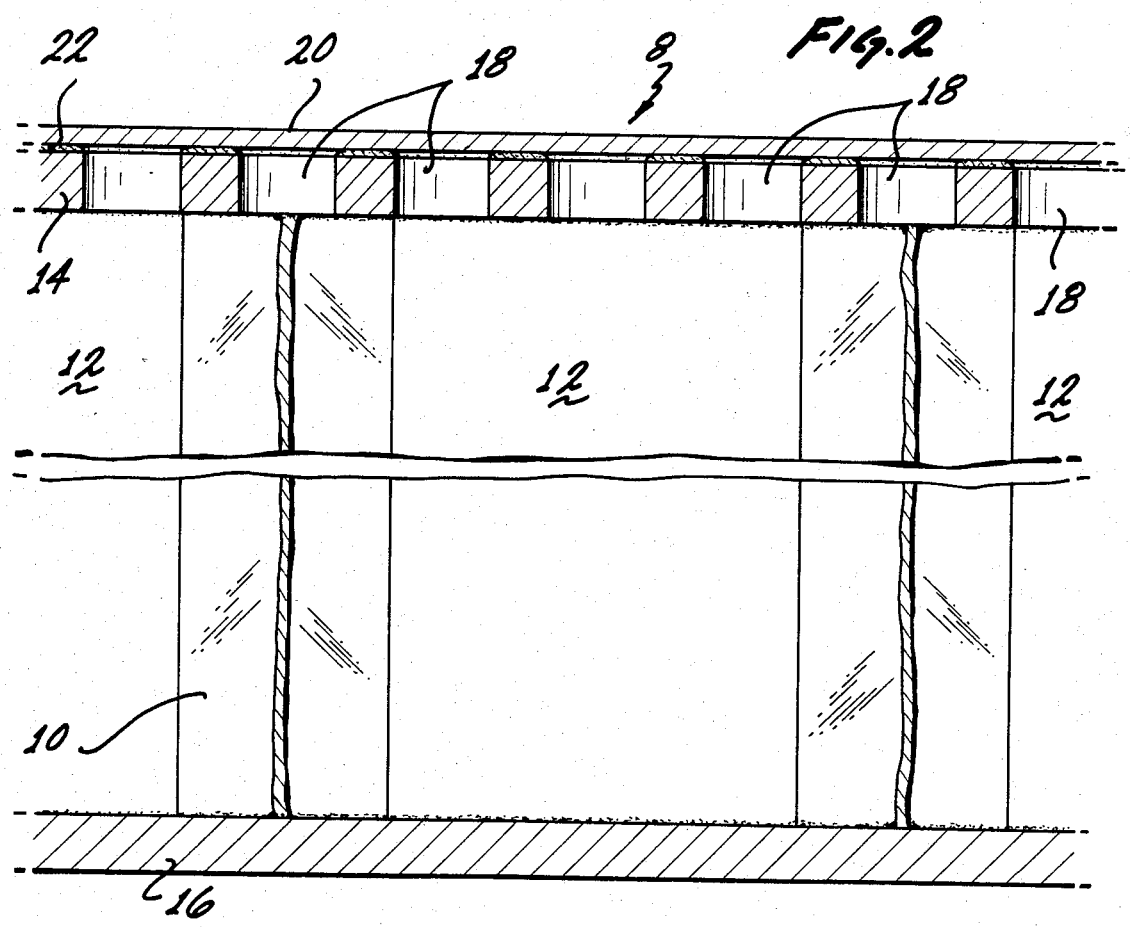
FIG. 2 is a fragmentary vertical section of the acoustic panel of FIG. 1.

Referring now to FIGS. 1 and 2 in detail. The process of the invention provides a honeycomb sandwich panel 8. The constituent elements of the honeycomb sandwich panel comprise a single honeycomb core 10, having a plurality of endwise directed cells 12 and outer facing sheets 14 and 16. The preferred materials for the core and the facing sheets when utilized in aircraft environment wherein weight is a critical requirement is aluminium due to its weight versus strength and cost characteristics. Other metals or materials could be used where these requirements are not considered. The facing sheet 14 is perforated with a plurality of small perforations 18, their size, for example, could range from 0.30 to 0.65 inches. The perforations 18 provide a range of from 15% to 36% open area to the facing sheet 14. The perforations 18 may be punched, drilled, or chem milled through the sheet 14. Chem milling is preferred as the finished cross sectional area can be predetermined and both surfaces of the sheet 14 remain smooth and do not require deburring, grinding, filling, etc., prior to their use. The perforations may be spaced at 0.081 inch intervals, and for example, a triangular pattern. Various other intervals and patterns may be used to successfully practice this invention. Sheet 16 is imperforate and forms one closed surface of the cell Helmholtz resonator cavity.

A thin porous fibrous material 20 is adhesively bonded to one surface of the perforate face sheet 14. The adhesive typically used to bond the various panel components is either AF-31 manufactured by the 3-M Company, metal bond 4021 manufactured by Narmco, FM-300 manufactured by Bloomingdale Aerospace Products, or adhesive having the same or similar characteristics as the above list. These adhesives generally consist of a low solid solvent solution. When the solvents are removed from these solutions by evaporation the viscosity index is elevated.

The preferred porous fibrous material 20 is a stainless steel Dutch twill woven material or the like. Other types of material and weave patterns may also be utilized to successfully practice this invention. In some applications of the attenuation panel a woven material, such as, the dutch twill may require that the strand crossover points be joined by methods well known in the art such as sintering, diffusion bonding or the like when stainless steel is used.

The adhesive coating for bonding the perforate sheet 14 to the porous fibrous material 20 is preferably applied by spraying on one surface of the perforate sheet a thin layer 22 of the aforementioned adhesive. The solvent from the adhesive is then removed by evaporation. The surface attraction forces cause the adhesive layer around each perforation 18 of the perforated sheet 14 to take a rounded, funnel like shape upon removal of the solvent. The now substantially solid or highly viscous adhesive remaining retains this funnel like shape, and later during the cure cycle does not soften and flow but merely becomes tacky sufficient to adhere to rather than flow into the porous material while maintaining the funnel like shape.

This inherent behavior of the selected adhesive material effectively enlarges the opening into the perforations 18 at the entrance side of the core cells of the end product, providing enhanced acoustic open area. An example is the use of a perforated sheet 14 having an actual geometric open area of approximately 34% wherein the final product has an effective open area of approximately 42% an increase of over 10%. This increase in effective open area can only be attributed to the rounded funnel like openings into the perforations created by the layer of adhesive 22 treated in the manner prescribed. The thickness of this layer of adhesive is in the range of 0.001 to 0.004 of an inch.

It has been found that this increased open area effect can be further enhanced by applying a thicker layer of adhesive in the range of 0.003 to 0.004 of an inch, removing the solvent, as herein before discussed, and then curing the adhesive layer by prolonged exposure to ambient temperature or by elevating the temperature of the perforated sheet 14 with a thicker layer of adhesive to a normal cure temperature recommended by the manufacture, generally in the range of 300° F. The thickness of the adhesive layer can be increased by successive thin layers of adhesive with solvent removal and curing between each layer. Effective open areas of approximately 50% have been achieved using a sheet of perforate material having an actual open area of approximately 34%. In the buildup/cure method an additional layer of adhesive is applied and the solvent is removed. The perforated layer is now ready as in the first instance to be adhered to the porous fibrous material and then final assembly.

When sizing of the finished panel is required to obtain a specific shape by cutting, trimming, etc., or drill through holes are required, the additional thickness of the adhesion buildup maintains continued isolation between the dissimilar metals of the perforate sheet 14 and the porous fibrous material 20 after the required sizing or drilling.

Another method for providing continuing isolation between dissimilar metals where sizing and/or drilling through the combined metals is required is the addition of thin layers of non-metallic cloth material therebetween, for example, material made from fiber glass, Kevlar or the like in the areas to be sized or drilled. A thickness of approximately 0.005 of an inch is found to be satisfactory even when used with single thin layers of adhesive.

After the perforate sheet and porous fibrous material are bonded together and cured by the desired aforementioned method, the components for the ultimate acoustic panel are then assembled. A layer of adhesive, such as FM 150 manufactured by Bloomingdale Aerospace Products, or the like, is applied to one surface of the imperforate sheet and the perforation exposed surface of the now combined perforate sheet and porous fibrous material, or the faying surfaces of the cells of the honeycomb core have a layer of appropriate adhesive applied thereto; the solvent is then removed from the AF-31 adhesive and the components are then stacked as shown in the various figures, namely, the honeycomb core is sandwiched between the imperforate sheet and the perforation exposed surface of the perforated sheet; pressure is then applied from the now outer surface of the imperforate sheet and the porous fibrous material towards the central honeycomb core. This pressure can be applied by any convenient means known in this art, such as, but not limited to a mechanical press or an autoclave; the adhesive on the combined components under pressure is then allowed to cure either by ambient or at an elevated temperature. After curing, the attenuation panel may be sized to a specific shape and/or drilled in the selected areas as desired.

Although the foregoing invention has been described in some detail by way of illustration and example, for the purposes of clarity of understanding, it should be understood that certain changes and modifications may be practiced within the spirit of the invention as limited only by the scope of the appended claims.

What is claimed as new and useful and desired to be secured by U.S. Letters Patent is:

1. The honeycomb sandwiched attenuation panel for use adjacent a high velocity gas flow area comprising:
  (a) a honeycomb core having a multiplicity of cells defined by substantially parallel walls of thin sheet material and having a pair of core faces;
  (b) a perforated facing sheet of end sheet material having on a surface thereat bonded to one said core face;
  (c) an imperforate facing sheet of thin sheet material bonded to the other said core face;
  (d) a thin sheet of porous fibrous material; and
  (e) an electrically insulating bonding medium isolating said thin sheet of porous fibrous material from said perforated facing sheet and bonded to said porous fibrous material and the other surface of said perforated facing sheet, wherein the bonding medium insulates said thin sheet of said porous fibrous material from said perforated facing sheet, the pores of said porous fibrous material providing a predetermined impeded communication between the core cells and the atmosphere through the open perforations of said perforated sheet.

2. The invention as defined in claim 1 wherein non-metallic cloth is positioned between the perforated sheet and said porous fibrous material at selected locations.

3. The invention as defined in claim 2 wherein said bonding medium between said perforated sheet and said porous fibrous material has a thickness from 0.001 to 0.004 inches.

4. The invention as defined in claim 2 wherein said bonding medium between said perforated sheet and said porous fibrous material has a thickness from 0.003 to 0.004 inches.

5. The invention as defined in claim 1 wherein said bonding medium between said perforated sheet and said porous fibrous material forms funnel shaped openings leading into the perforations of said perforated sheet.

6. The invention as defined in claim 4 wherein said bonding medium between said perforated sheet and said porous fibrous material forms funnel shaped openings leading into the perforations of said perforated sheet.

7. The invention as defined in claim 1 wherein the perforations of said perforated sheet range in size from 0.30 to 0.65 inches.

8. The invention as defined in claim 6 wherein the perforations of said perforated sheet range in size from 0.30 to 0.65 inches.

9. The invention as defined in claim 1 wherein the perforations in said perforated sheet provide from 15% to 36% open area thereto.

10. The invention as defined in claim 8 wherein the perforations in said perforated sheet provide from 15% to 36% open area thereto.

11. The invention as defined in claim 1 wherein the perforations of said perforated sheet range in size from 0.30 to 0.65 inches and provide from 15% to 36% of open area thereto.

12. The invention as defined in claim 1 wherein the bonding medium between said perforated sheet and said porous fibrous material forms funnel shaped openings leading into the perforations of said perforated sheet thereby providing an effective open area in said perforated sheet 10% greater than its actual open area.

13. The invention as defined in claim 1 wherein said core and facing sheets are constructed of aluminum and said porous fibrous material is constructed of stainless steel.

14. The invention as defined in claim 10 wherein said core and facing sheets are constructed of aluminum and said porous fibrous material is constructed of stainless steel.

15. The invention as defined in claim 1 wherein said porous fibrous material is a stainless steel Dutch twill woven material.

16. The invention as defined in claim 14 wherein said porous fibrous material is a stainless steel Dutch twill woven material.

17. The invention as defined in claim 1 wherein the bonding medium for bonding the perforated sheet to said porous fibrous material is a low solid solvent solution.

18. The invention as defined in claim 16 wherein the bonding medium for bonding the perforated sheet to said porous fibrous material is a low solid solvent solution.

* * * * *